(12) United States Patent
Deng et al.

(10) Patent No.: US 7,107,210 B2
(45) Date of Patent: Sep. 12, 2006

(54) METHOD OF NOISE REDUCTION BASED ON DYNAMIC ASPECTS OF SPEECH

(75) Inventors: Li Deng, Redmond, WA (US); James G. Droppo, Duvall, WA (US); Alejandro Acero, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 939 days.

(21) Appl. No.: 10/152,143

(22) Filed: May 20, 2002

(65) Prior Publication Data

US 2003/0216911 A1 Nov. 20, 2003

(51) Int. Cl.
*G10L 15/20* (2006.01)
*G10L 21/02* (2006.01)

(52) U.S. Cl. ............... 704/226; 704/233; 704/236
(58) Field of Classification Search ........... 704/226, 704/227, 228, 233, 256, 256.1, 256.2, 256.3, 704/256.7, 236
See application file for complete search history.

(56) References Cited

U.S. PATENT DOCUMENTS

| | | | |
|---|---|---|---|
| 4,897,878 A | 1/1990 | Boll et al. | 704/233 |
| 5,148,489 A | 9/1992 | Erell et al. | 704/226 |
| 5,604,839 A | 2/1997 | Acero et al. | 704/234 |
| 5,924,065 A | 7/1999 | Eberman et al. | 704/231 |
| 6,098,040 A * | 8/2000 | Petroni et al. | 704/234 |
| 6,173,258 B1 * | 1/2001 | Menendez-Pidal et al. | 704/233 |
| 6,202,047 B1 | 3/2001 | Ephraim et al. | 704/256.6 |
| 6,418,411 B1 * | 7/2002 | Gong | 704/256.5 |
| 6,577,997 B1 | 6/2003 | Gong | 704/252 |
| 6,633,842 B1 | 10/2003 | Gong | 704/233 |
| 6,633,843 B1 * | 10/2003 | Gong | 704/233 |
| 6,865,531 B1 | 3/2005 | Huang | 704/226 |
| 6,876,966 B1 * | 4/2005 | Deng et al. | 704/233 |
| 6,898,566 B1 * | 5/2005 | Benyassine et al. | 704/226 |
| 6,915,259 B1 * | 7/2005 | Rigazio et al. | 704/244 |
| 6,944,590 B1 * | 9/2005 | Deng et al. | 704/228 |
| 6,959,276 B1 * | 10/2005 | Droppo et al. | 704/226 |
| 6,980,952 B1 | 12/2005 | Gong | 704/234 |
| 6,985,858 B1 | 1/2006 | Frey et al. | 704/233 |
| 6,990,447 B1 | 1/2006 | Attias et al. | 704/240 |
| 2003/0055627 A1 * | 3/2003 | Balan et al. | 704/200.1 |
| 2003/0191638 A1 * | 10/2003 | Droppo et al. | 704/228 |

OTHER PUBLICATIONS

Deng et al., "Incremental Bayes Learning with Prior Evolution for Tracking Nonstationary Noise Statistics from Noisy Speech Data", ICASSP '03, Apr. 6-10, 2003, vol. 1, pp. I-672 to I-675.*

Droppo et al., "Noise Robust Speech Recognition with a Switching Linear Dynamic Model", ICASSP '04, May 17-24, 2004, vol. 1, pp. I-953 to I-956.*

(Continued)

*Primary Examiner*—Martin Lerner
(74) *Attorney, Agent, or Firm*—Thedodore M. Magee; Westman, Champlin & Kelly, P.A.

(57) ABSTRACT

A system and method are provided that reduce noise in pattern recognition signals. To do this, embodiments of the present invention utilize a prior model of dynamic aspects of clean speech together with one or both of a prior model of static aspects of clean speech, and an acoustic model that indicates the relationship between clean speech, noisy speech and noise. In one embodiment, components of a noise-reduced feature vector are produced by forming a weighted sum of predicted values from the prior model of dynamic aspects of clean speech, the prior model of static aspects of clean speech and the acoustic-environmental model.

29 Claims, 4 Drawing Sheets

OTHER PUBLICATIONS

Deng et al., "Estimating Cepstrum of Speech under the Presence of Noise using a Joint Prior of Static and Dynamic Features," IEEE Transactions on Speech and Audio, May 2004, vol. 12, Issue 3, pp. 218 to 233.*

Droppo, J. et al, "Uncertainty Decoding with Splice for Noise Robust Speech Recognition," Proceedings of International Conference on Acoustics, Speech and Signal Processing, pp. I-57-60, vol. 1, May 2002.

Droppo, J. et al, "Evaluation of the SPLICE Algorithm on the Aurora2 Database," 7th European Conference on Speech Communication and Technology, Proceedings of Eurospeech 2001, Aalborg, Denmark.

Li Deng et al, "A Bayesian Approach to Speech Feature Enhancement using the Dynamic Cepstral Prior," Proceedings of International Conference on Acoustics, Speech and Signal Processing, pp. I-829-32, vol. 1, May 2002.

PCT Search Report for International Application No. PCT/US 03/16032.

"Learning Dynamic Noise Models From Noisy Speech for Robust Speech Recognition," Brendan J. Frey, et al., Neural Information Processing Systems Conference, 2001, pp. 1165-1121.

"Speech Denoising and Dereverberation Using Probabilistic Models," Hagai Attias, et al., Advances in NIPS, vol. 13, 2000 pp. 758-764.

"Statistical-Model-Based Speech Enhancement Systems," Proc. of IEEE, vol. 80, No. 10, Oct. 1992, pp. 1526-1555.

"HMM-Based Strategies for Enhancement of Speech Signals Embedded in Nonstationary Noise," Hossein Sameti, IEEE Trans. Speech Audio Processing, vol. 6, No. 5, Sep. 1998, pp. 445-455.

"Model-based Compensation of the Additive Noise for Continuous Speech Recognition," J.C. Segura, et al., Eurospeech 2001.

"Large-Vocabulary Speech Recognition Under Adverse Acoustic Environments," Li Deng, et al., Proc. ICSLP, vol. 3, 2000, pp. 806-809.

"A New Method for Speech Denoising and Robust Speech Recognition Using Probabilistic Models for Clean Speech and for Noise," Hagai Attias, et al., Proc. Eurospeech, 2001, pp. 1903-1906.

"Evaluation of the SPLICE Algorithm on the Aurora2 Database," Droppo, et al., Proc. Eurospeech, 2001.

"Recursive Noise Estimation Using Iterative Stochastic Approximation For Stereo-Based Robust Speech Recognition," Deng, et al., Proceedings of Automatic Speech Recognition and Understanding 2001.

U.S. Appl. No. 10/152,127, filed May 20, 2002, James Droppo et al.

U.S. Appl. No. 10/236,042, filed Sep. 5, 2002, Li Deng et al.

"HMM Adaptation Using Vector Taylor Series for Noisy Speech Recognition," Alex Acero, et al., Proc. ICSLP, vol. 3, 2000, pp. 869-872.

"Sequential Noise Estimation with Optimal Forgetting for Robust Speech Recognition," Mohomed Afify, et al., Proc. ICASSP, vol. 1, 2001, pp. 229-232.

"High-Performance Robust Speech Recognition Using Stereo Training Data," Li Deng, et al., Proc. ICASSP, vol. 1, 2001, pp. 301-304.

"ALGONQUIN: Iterating Laplace's Method to Remove Multiple Types of Acoustic Distortion for Robust Speech Recognition," Brendan J. Frey, et al., Proc. Eurospeech, Sep. 2001, Aalborg, Denmark.

"Nonstationary Environment Compensation Based on Sequential Estimation," Nam Soo Kim, IEEE Signal Processing Letters, vol. 5, 1998, pp. 57-60.

"On-line Estimation of Hidden Markov Model Parameters Based on the Kullback-Leibler Information Measure," Vikram Krishnamurthy, et al., IEEE Trans. Sig. Proc., vol. 41, 1993, pp. 2557-2573.

"A Vector Taylor Series Approach for Environment-Independent Speech Recognition," Pedro J. Moreno, ICASSP, vol. 1, 1996, pp. 733-736.

"Recursive Parameter Estimation Using Incomplete Data," D.M. Titterington, J. J. Royal Stat. Soc., vol. 46(B), 1984, pp. 257-267.

"The Aurora Experimental Framework for the Performance Evaluations of Speech Recognition Systems Under Noisy Conditions," David Pearce, et al., Proc. ISCA IIRW ASR 2000, Sep. 2000.

"Efficient On-Line Acoustic Environment Estimation for FCDCN in a Continuous Speech Recognition System," Jasha Droppo, et al., ICASSP, 2001.

"Speech Recognition in Noisy Environments," Pedro J. Moreno, Ph.D thesis, Carnegie Mellon University, 1996.

"Robust Automatic Speech Recognition With Missing and Unreliable Acoustic Data," Martin Cooke, Speech Communication, vol. 34, No. 3, pp. 267-285, Jun. 2001.

* cited by examiner

METHOD OF NOISE REDUCTION BASED ON DYNAMIC ASPECTS OF SPEECH

BACKGROUND OF THE INVENTION

The present invention relates to noise reduction. In particular, the present invention relates to removing noise from signals used in pattern recognition.

A pattern recognition system, such as a speech recognition system, takes an input signal and attempts to decode the signal to find a pattern represented by the signal. For example, in a speech recognition system, a speech signal (often referred to as a test signal) is received by the recognition system and is decoded to identify a string of words represented by the speech signal.

To decode the incoming test signal, most recognition systems utilize one or more models that describe the likelihood that a portion of the test signal represents a particular pattern. Examples of such models include Neural Nets, Dynamic Time Warping, segment models, and Hidden Markov Models.

Before a model can be used to decode an incoming signal, it must be trained. This is typically done by measuring input training signals generated from a known training pattern. For example, in speech recognition, a collection of speech signals is generated by speakers reading from a known text. These speech signals are then used to train the models.

In order for the models to work optimally, the signals used to train the model should be similar to the eventual test signals that are decoded. In particular, the training signals should have the same amount and type of noise as the test signals that are decoded.

Typically, the training signal is collected under "clean" conditions and is considered to be relatively noise free. To achieve this same low level of noise in the test signal, many prior art systems apply noise reduction techniques to the testing data.

In one technique for removing noise, the prior art identifies a set of correction vectors from a stereo signal formed of two channel signals, each channel containing the same pattern signal. One of the channel signals is "clean" and the other includes additive noise. Using feature vectors that represent frames of these channel signals, a collection of noise correction vectors are determined by subtracting feature vectors of the noisy channel signal from feature vectors of the clean channel signal. When a feature vector of a noisy pattern signal, either a training signal or a test signal, is later received, a suitable correction vector is added to the feature vector to produce a noise reduced feature vector.

In other systems, noise-reduced feature vectors are estimated using models of static aspects of noise, models of the static aspects of clean speech and an observation or acoustic model that predicts the value of a clean speech vector given a noisy speech vector and a noise vector. Although such systems are effective, they are not ideal because the models only represent static aspects of noise and clean speech. They do not represent the dynamic relationships found between neighboring frames of noise and neighboring frames of clean speech. As a result, the sequences of noise-reduced feature vectors produced by these systems tend to include a large number of discontinuities between neighboring feature vectors. In other words, the changes between neighboring noise-reduced feature vectors are not as smooth as in normal speech.

In light of this, a noise reduction technique is needed that is more effective at removing noise from pattern signals.

SUMMARY OF THE INVENTION

A system and method are provided that reduce noise in pattern recognition signals. To do this, embodiments of the present invention utilize a prior model of dynamic aspects of clean speech together with one or both of a prior model of static aspects of clean speech, and an acoustic model that indicates the relationship between clean speech, noisy speech and noise. In one embodiment, components of a noise-reduced feature vector are produced by forming a weighted sum of predicted values from the prior model of dynamic aspects of clean speech, the prior model of static aspects of clean speech and the acoustic model.

DETAILED DESCRIPTION OF ILLUSTRATIVE EMBODIMENTS

Figure 1:
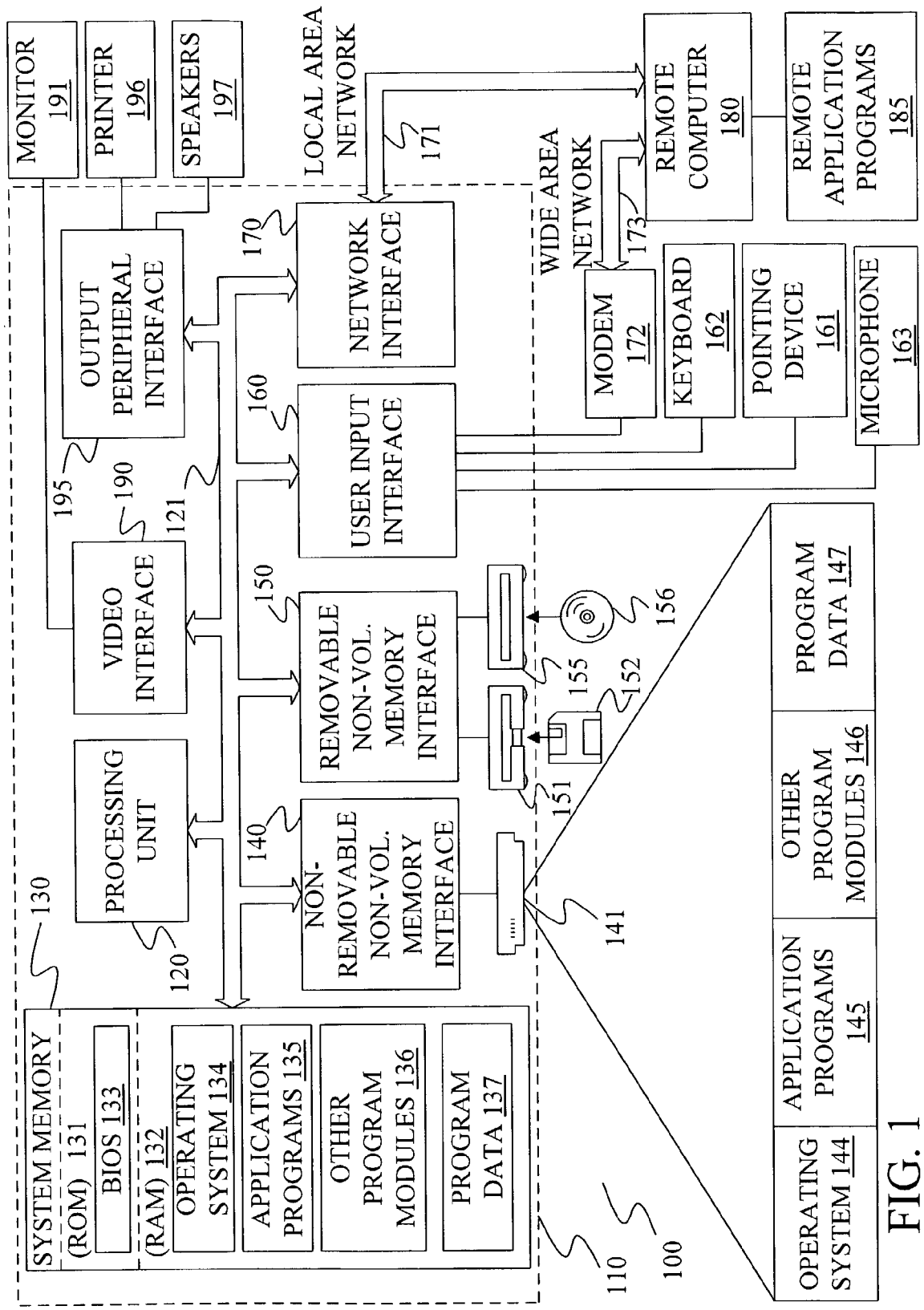
FIG. 1 is a block diagram of one computing environment in which the present invention may be practiced.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well-known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

Figure 2:
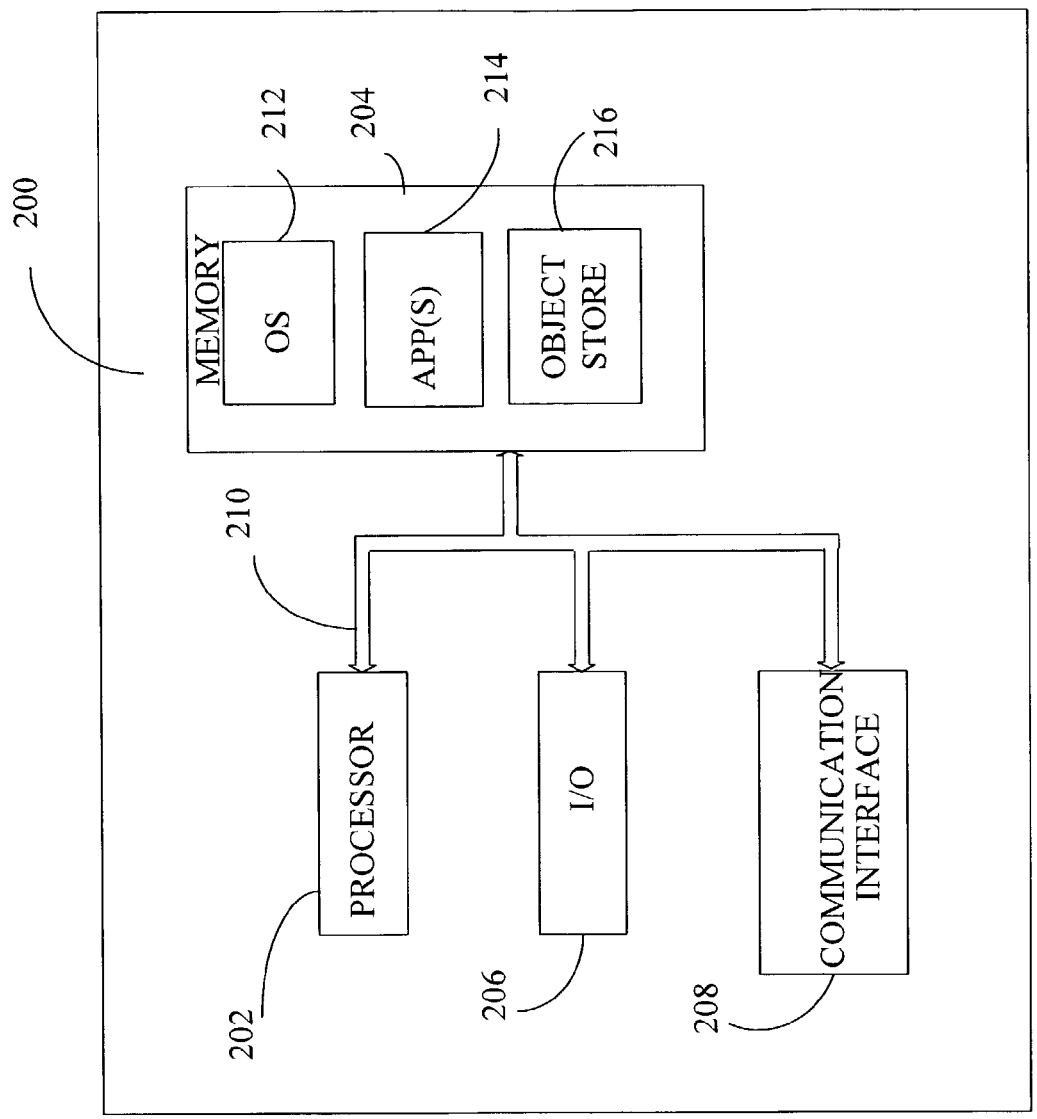
FIG. 2 is a block diagram of an alternative computing environment in which the present invention may be practiced.

FIG. 2 is a block diagram of a mobile device 200, which is an exemplary computing environment. Mobile device 200 includes a microprocessor 202, memory 204, input/output (I/O) components 206, and a communication interface 208 for communicating with remote computers or other mobile devices. In one embodiment, the afore-mentioned components are coupled for communication with one another over a suitable bus 210.

Memory 204 is implemented as non-volatile electronic memory such as random access memory (RAM) with a battery back-up module (not shown) such that information stored in memory 204 is not lost when the general power to mobile device 200 is shut down. A portion of memory 204 is preferably allocated as addressable memory for program execution, while another portion of memory 204 is preferably used for storage, such as to simulate storage on a disk drive.

Memory 204 includes an operating system 212, application programs 214 as well as an object store 216. During operation, operating system 212 is preferably executed by processor 202 from memory 204. Operating system 212, in one preferred embodiment, is a WINDOWS® CE brand operating system commercially available from Microsoft Corporation. Operating system 212 is preferably designed for mobile devices, and implements database features that can be utilized by applications 214 through a set of exposed application programming interfaces and methods. The objects in object store 216 are maintained by applications 214 and operating system 212, at least partially in response to calls to the exposed application programming interfaces and methods.

Communication interface 208 represents numerous devices and technologies that allow mobile device 200 to send and receive information. The devices include wired and wireless modems, satellite receivers and broadcast tuners to name a few. Mobile device 200 can also be directly connected to a computer to exchange data therewith. In such cases, communication interface 208 can be an infrared transceiver or a serial or parallel communication connection, all of which are capable of transmitting streaming information.

Input/output components 206 include a variety of input devices such as a touch-sensitive screen, buttons, rollers, and a microphone as well as a variety of output devices including an audio generator, a vibrating device, and a display. The devices listed above are by way of example and need not all be present on mobile device 200. In addition, other input/output devices may be attached to or found with mobile device 200 within the scope of the present invention.

Under one aspect of the present invention, a system and method are provided that reduce noise in pattern recognition signals. To do this, embodiments of the present invention utilize a prior model of dynamic aspects of clean speech together with one or both of a prior model of static aspects of clean speech, and an acoustic-distortion or acoustic-environmental model that describes the relationship between clean speech, noisy speech and noise.

In the discussion below, the method is performed in the cepstral domain. In particular, each frame of clean speech, noisy speech, and noise, is represented by a cepstral feature vector that is formed by taking the log of the frequency-domain representation of the signal within the frame. Thus, in the discussion below, the method attempts to identify a noise-reduced feature vector from a noisy speech feature vector.

In particular, the minimum mean square estimate of the noise-reduced vector is determined using the conditional expectation:

$$\hat{x}_t = E[x_t|y_t, \hat{x}_{t-1}] = \int x_t p(x_t|y_t, \hat{x}_{t-1}) dx_t \qquad \text{EQ. 1}$$

where $\hat{x}_t$ is the estimate for the noise-reduced feature vector of the current frame, $\hat{x}_{t-1}$ is the estimate for the noise-reduced feature vector determined for a previous frame, $y_t$ is a noisy speech feature vector for the current frame, and $x_t$ is a clean speech feature vector for the current frame.

Using Bayes rule, the estimate in Equation 1 can be restated as:

$$\hat{x}_i = \frac{\int x_i p(x_i|\hat{x}_{i-1}) p(y_i|x_i) dx_i}{p(y_i)} \qquad \text{EQ. 2}$$

where $p(x_t|\hat{x}_{t-1})$ is the conditional probability of a clean speech vector, $x_t$, given the estimate of the clean speech vector at the preceding frame, $\hat{x}_{t-1}$, $p(y_t|x_t)$ is the conditional probability of a noisy speech vector, $y_t$, given a clean speech vector, $x_t$, and $p(y_t)$ is the probability of a noisy speech vector, $y_t$.

Under one embodiment of the present invention, a mixture model is used to describe the conditional probability $p(x_t|\hat{x}_{t-1})$. In terms of an equation:

$$p(x_i|\hat{x}_{i-1}) = \sum_{m=1}^{M} c_m p(x_i|m, \hat{x}_{i-1}) \qquad \text{EQ. 3}$$

where the conditional prior probability $p(x_t|m,\hat{x}_{t-1})$ is the probability provided by the mth mixture component and $c_m$ is a weighting factor for the mth mixture component.

Under one embodiment, noisy speech is considered to be the result of noise being added to clean speech. In the time domain, this addition is linear. However, in the cepstral feature domain, this addition becomes non-linear resulting in a feature vector relationship of:

$$y_t = x_t + g(n_t - x_t) + r \qquad \text{EQ. 4}$$

where $$g(n_t - x_t) = \log(1 + e^{n_t - x_t}) \qquad \text{EQ. 5}$$

and r is a residual.

To make the expression of Equation 4 easier to use, the non-linearity is linearized using a truncated Taylor series approximation. In particular, a zero-th order Taylor series expansion on $g(n_t - x_t)$ at $x_t = x_0$ is used to form the approximation:

$$y_t \approx x_t + g(\bar{n} - x_0) + r \qquad \text{EQ. 6}$$

where $g(\bar{n} - x_0)$ is the zero-th order Taylor series, expansion at expansion point $x_0$, and $\bar{n}$ is an estimate of the noise in the current frame. In most embodiments, the expansion, $x_0$, is selected as the estimate of the clean speech signal from the preceding frame, $\hat{x}_{t-1}$, and $\bar{n}$ is determined using a recursive technique such as the one disclosed in a pending U.S. patent application entitled METHOD OF ITERATIVE NOISE ESTIMATION IN A RECURSIVE FRAMEWORK, filed on Apr. 5, 2002 and having Ser. No. 10/116,792 now U.S. Pat. No. 6,944,590 issued 13 Sep. 2005. Those skilled in the art will recognize that the recursive technique for noise estimation is one example of a number of different noise estimation techniques that may be utilized with the present invention.

Based on the relationship shown in Equation 6, the conditional probability $p(y_t|x_t)$ of Equation 2 becomes an acoustic environment probability $p(y_t|x_t,\bar{n}_t)$. Using this acoustic environment probability and Equation 3 above, Equation 2 can be re-written as:

$$\hat{x}_i = \frac{\sum_{m=1}^{M} c_m \int x_i p(x_i|m, \hat{x}_{i-1}) p(y_i|x_i, \bar{n}_i) dx_i}{p(y_i)} \qquad \text{EQ. 7}$$

To compute the integral of Equation 7, the conditional prior, $p(x_t|m,\hat{x}_{t-1})$, is first evaluated. To make this evaluation easier, it is recognized that:

$$p(x_t|m,\hat{x}_{t-1}) \propto p(x_t, \Delta x_t|m) \qquad \text{EQ. 8}$$

where $$\Delta x_t = x_t - \hat{x}_{t-1} \qquad \text{EQ. 9}$$

Thus, in Equation 8, $x_t$ represents the static aspects of clean speech and $\Delta x_t$ represents the dynamic aspects of clean speech.

To further simplify the evaluation of the conditional prior, it is assumed that the static aspects of clean speech are uncorrelated to the dynamic aspects of clean speech. As-a result:

$$p(x_t, \Delta x_t|m) = p(x_t|m) p(\Delta x_t|m) \qquad \text{EQ. 10}$$

Under one embodiment, the prior probability for the static aspects of clean speech and the prior probability for the dynamic aspects of clean speech are each modeled as Gaussian distributions such that:

$$p(x_t, \Delta x_t|m) = N(x_t;\mu_m^x, \Phi_m^x) N(\Delta x_t;\mu_m^{\Delta x}, \Phi_m^{\Delta x}) \qquad 11$$

where $\mu_m^x$ and $\Phi_m^x$ are the mean and variance of the prior model for the static aspects of clean speech, and $\mu_m^{\Delta x}$ and $\Phi_m^{\Delta x}$ are the mean and variance of the prior model for the dynamic aspects of clean speech.

Fitting the exponent in the product of the above two Gaussian distributions into the standard quadratic form in $x_t$, and using Equation 8 above, produces:

$$p(x_t|m,\hat{x}_{t-1}) = N(x_t;\mu_m, \Phi_m) \qquad \text{EQ. 12}$$

where $$\mu_m = \frac{\Phi_m^{\Delta x}}{(\Phi_m^x + \Phi_m^{\Delta x})} \mu_m^x + \frac{\Phi_m^{\Delta x}}{(\Phi_m^x + \Phi_m^{\Delta x})} (x_{i-1} + \mu_m^{\Delta x}) \qquad \text{EQ. 13}$$

-continued $$\text{and } \Phi_m = \frac{\Phi_m^x \Phi_m^{\Delta x}}{(\Phi_m^x + \Phi_m^{\Delta x})} \qquad \text{EQ. 14}$$

In many embodiments, the acoustic environment probability, $p(y_t|x_t,\bar{n}_t)$, is also modeled as a Gaussian distribution producing an acoustic model of the form:

$$p(y_t|x_t,n_t) = N(y_t; x_t + g(\bar{n}-x_0), \Psi) \qquad \text{EQ. 15}$$

where $\Psi$ is a fixed diagonal covariance matrix that is an approximation to the covariance matrix for the residual r.

Thus, the integral in the numerator of Equation 7 becomes:

$$I_m = \int x_t N(x_t;\mu_m, \Phi_m) N(y_t; x_t + g(\bar{n}-x_0), \Psi) dx_t \qquad \text{EQ. 16}$$

Evaluating the integral produces:

$$I_m = [v_1(m)\mu_m^x + v_2(m)(x_{t-1} + \mu_m^{\Delta x}) + w_2(m)(y_t - g(\bar{n}-x_0))] N_m(y_t) \qquad \text{EQ. 17}$$

where $$N_m(y_t) = N(y_t;\mu_m^x + g(\bar{n}-x_0), \Phi_m^x + \Psi) \qquad \text{EQ. 18}$$

$$v_1(m) = \frac{\Psi}{(\Phi_m^x + \Psi)} \frac{\Phi_m^{\Delta x}}{(\Phi_m^x + \Phi_m^{\Delta x})} \qquad \text{EQ. 19}$$

$$v_2(m) = \frac{\Psi}{(\Phi_m^x + \Psi)} \frac{\Phi_m^x}{(\Phi_m^x + \Phi_m^{\Delta x})} \qquad \text{EQ. 20}$$

$$w_2(m) = 1 - \frac{\Psi}{(\Phi_m^x + \Psi)} \qquad \text{EQ. 21}$$

The Gaussian distribution in Equation 18 can be shown to be the likelihood of observation $y_t$ given the m-th component in the clean speech model under the zero-th order approximation made in Equation 15. That is:

$$p(y_t|m) \approx N_m(y_t) \qquad \text{EQ. 22}$$

As a result, the denominator in Equation 7 can be determined as:

$$p(y_i) = \sum_{m=1}^{M} c_m p(y_i|m) \approx \sum_{m=1}^{M} c_m N_m(y_i) \qquad \text{EQ. 23}$$

Combining Equations 7, 17, and 23 produces the estimator for $x_t$:

$$x_i = \sum_{m=1}^{M} \gamma_m(y_i)[v_1(m)\mu_m^x + v_1(m)(x_{i-1} + \mu_m^{\Delta x}) + w_2(m)(y_i - g(\bar{n} - x_0))] \qquad \text{EQ. 24}$$

$$\text{where } \gamma_m(y_i) = \frac{c_m N_m(y_i)}{\sum_{m=1}^{M} c_m N_m(y_i)} \qquad \text{EQ. 25}$$

Each summand in Equation 24 is a mixture component contribution to the final reduced-noise vector. Each summand is formed by multiplying the weighted sum of three terms by the relative probability of the noisy feature vector, $y_t$, occurring given the mixture component. The first term is the prediction of the reduced-noise vector taken from the mean of the static aspects of the prior clean speech model, $\mu_m^x$. The second term is the prediction for the reduced-noise vector based on the estimate of the reduced-noise vector for the preceding frame and the mean of the dynamic aspects of the prior clean speech model, $(x_{t-1}+\mu_m^{\Delta x})$. The last term, $y_t-g(\bar{n}-x_0)$, is the prediction for the noise-reduced clean-speech vector based on the acoustic model in absence of any prior information.

Thus, the estimator of Equation 24 utilizes a prior model of static aspects of clean speech, a prior model of dynamic aspects of clean speech and an acoustic distortion model. As a result, the sequence of noise-reduced vectors produced using the estimator of Equation 24 contain fewer discontinuities and appear more natural.

In addition, the weighting values applied to each of the terms in each summand are such that as the variance of one of the terms increases, its relative weighting decreases. Thus, as a term becomes more accurate in its description of the noise-reduced value, its weighting increases relative to the weighting of the other terms.

For example, the weighting value applied to the value predicted by the prior model for static aspects of clean speech is a function of the variance of the prior model for dynamic aspects of clean speech. As a result, when the variance of the model for the dynamic aspects of cleans speech increases relative to the variance of the model for the static aspects of clean speech, the relative weighting of the value predicted by the prior model for static aspects increases.

A similar effect occurs for the weighting of the value predicted by the prior model for the dynamic aspects of clean speech, since this weighting value is a function of the variance of the prior model for the static aspects of clean speech.

Note that although the estimator of Equation 24 utilizes three terms, the present invention may also be practiced utilizing only the first two terms, the prior models for the static and dynamic aspects of clean speech, or by using only the last two terms, the prior model for the dynamic aspects of speech and the acoustic model.

Before the estimator of Equation 25 can be used, the parameters for the various models must be trained. Under one embodiment, an EM algorithm is used to train the mean and covariance parameters $\mu_m^x$, $\Phi_m^x$, $\mu_m^{\Delta x}$ and $\Phi_m^{\Delta x}$ in the cepstral domain. During this training process, the mixture component weights, $c_m$, are also trained. Techniques for performing such training are well known in the art. The fixed covariance matrix, $\Psi$, is estimated by pooling the training data with all available signal to noise ratios.

Figure 3:
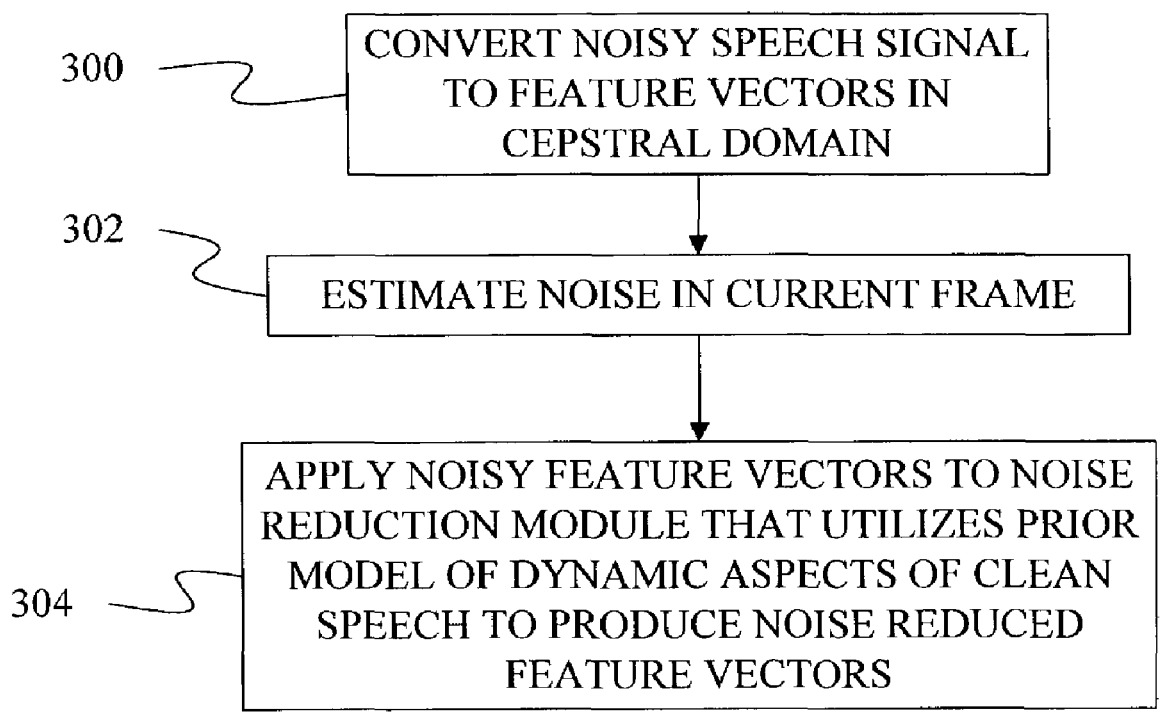
FIG. 3 is a flow diagram of a method of using a noise reduction system of one embodiment of the present invention.
Figure 4:
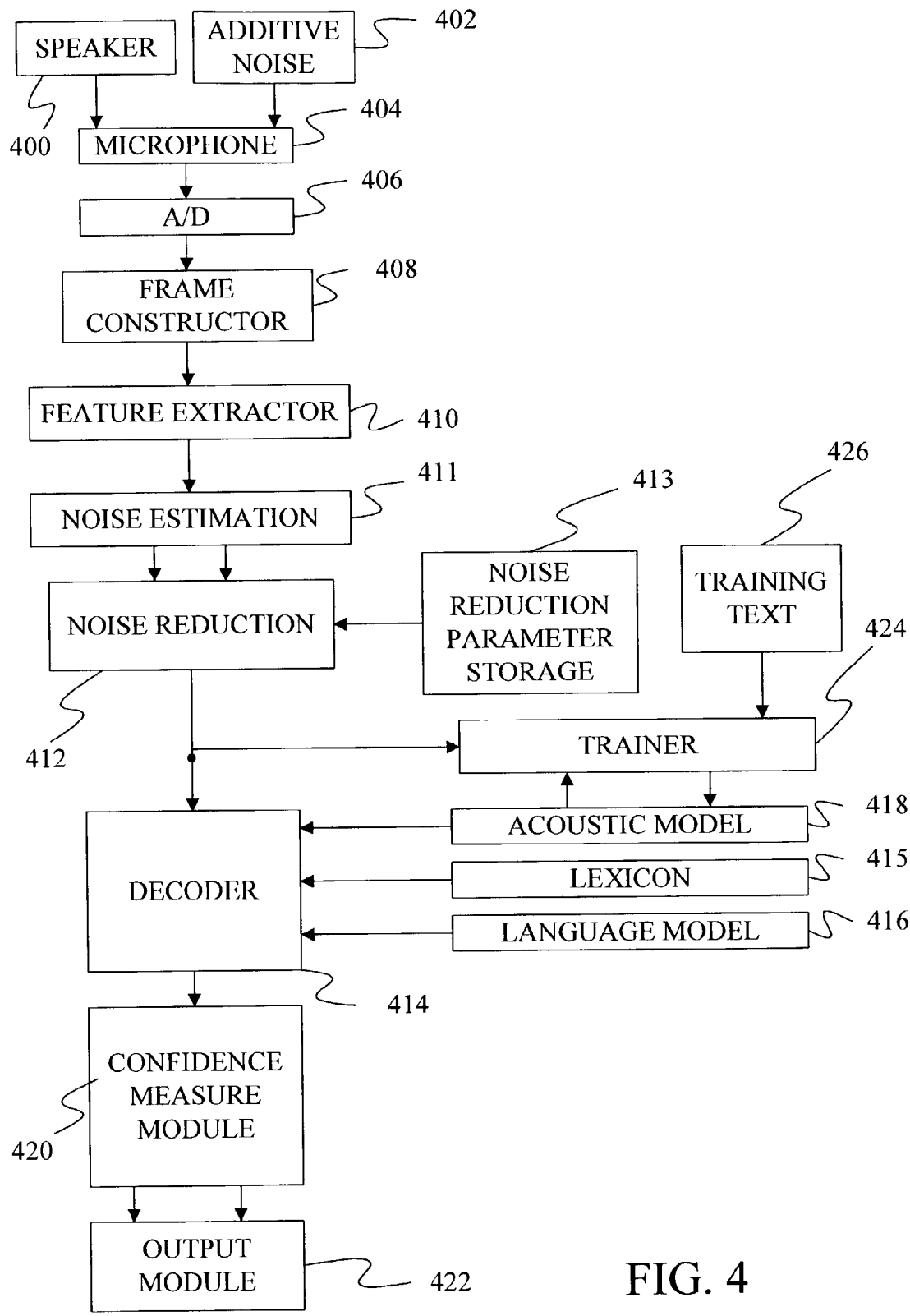
FIG. 4 is a block diagram of a pattern recognition system in which embodiments of the present invention may be used.

A method and system for using the present invention in speech recognition is shown in the flow diagram of FIG. 3 and the block diagram of FIG. 4. The method begins in step 300 of FIG. 3, where a noisy speech signal is converted into a sequence of feature vectors. To do this, a microphone 404 of FIG. 4, converts audio waves from a speaker 400 and one or more additive noise sources 402 into electrical signals. The electrical signals are then sampled by an analog-to-digital converter 406 to generate a sequence of digital values, which are grouped into frames of values by a frame constructor 408. In one embodiment, A-to-D converter 406 samples the analog signal at 16 kHz and 16 bits per sample, thereby creating 32 kilobytes of speech data per second and frame constructor 408 creates a new frame every 10 milliseconds that includes 25 milliseconds worth of data.

Each frame of data provided by frame constructor 408 is converted into a feature vector by a feature extractor 410. Methods for identifying such feature vectors are well known in the art and include 13-dimensional Mel-Frequency Cepstrum Coefficients (MFCC) extraction.

In step 302 of FIG. 3, the feature vectors for the noisy speech signal are provided to a noise estimation module 411 in FIG. 4. Noise estimation module 411 estimates the noise in the current frame and provides a feature vector representing the noise estimate together with the noisy speech signal to a noise reduction module 412.

In step 304 of FIG. 3, noise reduction module 412 uses Equation 24 above and the model parameters of Equation 24, which are stored in noise reduction parameter storage 413, to produce a sequence of noise-reduced feature vectors from the sequence of noisy feature vectors. In particular, noise reduction module 412 uses the distribution parameters for the prior model of the dynamic aspects of clean speech together with the distribution parameters of the prior model of the static aspects of clean speech and/or an acoustic model, as described above.

The output of noise reduction module 412 is a series of noise-reduced feature vectors. If the input signal is a training signal, this series of noise-reduced feature vectors is provided to a trainer 424, which uses the noise-reduced feature vectors and a training text 426 to train an acoustic model 418. Techniques for training such models are known in the art and a description of them is not required for an understanding of the present invention.

If the input signal is a test signal, the noise-reduced feature vectors are provided to a decoder 414, which identifies a most likely sequence of words based on the stream of feature vectors, a lexicon 415, a language model 416, and the acoustic model 418. The particular method used for decoding is not important to the present invention and any of several known methods for decoding may be used.

The most probable sequence of hypothesis words is provided to a confidence measure module 420. Confidence measure module 420 identifies which words are most likely to have been improperly identified by the speech recognizer, based in part on a secondary acoustic model(not shown). Confidence measure module 420 then provides the sequence of hypothesis words to an output module 422 along with identifiers indicating which words may have been improperly identified. Those skilled in the art will recognize that confidence measure module 420 is not necessary for the practice of the present invention.

Although FIG. 4 depicts a speech recognition system, the present invention may be used in any pattern recognition system and is not limited to speech.

Although the present invention has been described with reference to particular embodiments, workers skilled in the art will recognize that changes may be made in form and detail without departing from the spirit and scope of the invention.

What is claimed is:

1. A method for reducing noise in a noisy input signal, the method comprising:
   converting a frame of the noisy input signal into an input feature vector;
   obtaining a static-based prediction for a noise-reduced feature vector using a prior model of static aspects of clean signals;
   obtaining a dynamic-based prediction for the noise-reduced feature vector using a prior model of dynamic aspects of clean signals;
   combining the static-based prediction and the dynamic-based prediction to form at least part of a combined prediction; and multiplying the combined prediction by a measure of the probability of the input feature vector occurring to produce at least one component of the noise-reduced feature vector.

2. The method of claim 1 further comprising:
performing the steps of obtaining a static-based prediction, obtaining a dynamic-based prediction, determining a measure of the probability of the input feature vector occurring, combining the static-based prediction and the dynamic-based prediction, and multiplying the combined prediction by the measure of the probability for each of a set of mixture components, each mixture component providing a component of the reduced-noise feature vector; and
combining each component of the reduced-noise feature vector together to form the reduced-noise feature vector.

3. The method of claim 1 wherein obtaining a static-based prediction comprises using a mean of a distribution of the prior model of static aspects of clean signals as the static-based prediction.

4. The method of claim 1 wherein obtaining a dynamic-based prediction comprises adding a noise-reduced feature vector from a preceding frame to a mean of a distribution of the prior model of dynamic aspects of clean signals.

5. The method of claim 1 wherein combining the static-based prediction and the dynamic-based prediction comprises:
multiplying the static-based prediction by a static-specific weighting value to produce a weighted static-based prediction;
multiplying the dynamic-based prediction by a dynamic-specific weighting value to produce a weighted dynamic-based prediction;
adding the weighted static-based prediction to the weighted dynamic-based prediction to form at least part of the combined prediction.

6. The method of claim 5 wherein the static-specific weighting value is a function of a variance of a distribution in the prior model of dynamic aspects of clean signals.

7. The method of claim 5 wherein the dynamic-specific weighting value is a function of a variance of a distribution in the prior model of static aspects of clean signals.

8. The method of claim 1 further comprising obtaining an acoustic environment-based prediction of the noise-reduced feature vector and wherein combining the static-based prediction and the dynamic-based prediction further comprises combining the static-based prediction, the dynamic-based prediction and the acoustic environment-based prediction to form at least part of the combined prediction.

9. The method of claim 8 wherein obtaining an acoustic environment-based prediction comprises:
estimating noise in a frame of the noisy input signal; and
using the noise estimate in a function to determine the acoustic environment-based prediction.

10. The method of claim 9 wherein using the noise estimate in a function comprises using the noise estimate in a function that includes a Taylor Series approximation.

11. The method of claim 10 wherein the Taylor series approximation is a zero-th order Taylor series expansion.

12. The method of claim 11 wherein using the noise estimate in a function further comprises also using the input feature vector in the function.

13. A computer-readable medium having computer-executable instructions for performing steps comprising:
using a prior model of static aspects of clean speech to produce a static-based predicted value;
using a prior model of dynamic aspects of clean speech to produce a dynamic-based predicted value;
applying a noisy feature vector representing a frame of noisy speech and an estimate of the noise in the frame to an acoustic environment model to produce an acoustic environment-based predicted value wherein the acoustic environment model is based on a non-linear function that describes a relationship between a noisy feature vector, a clean feature vector, and a noise feature vector; and
combining the static-based predicted value, the dynamic-based predicted value and the acoustic environment-based predicted value to form at least one component of a noise-reduced feature vector.

14. The computer-readable medium of claim 13 wherein using a prior model of static aspects of clean speech comprises selecting a mean of a distribution in the prior model of static aspects of clean speech as the static-based predicted value.

15. The computer-readable medium of claim 13 wherein using a prior model of dynamic aspects of clean speech comprises adding a noise-reduced feature vector to a mean of a distribution in the prior model of dynamic aspects of clean speech to produce the dynamic-based predicted value.

16. The computer-readable medium of claim 13 wherein the acoustic environment model is formed from a Taylor series approximation to the non-linear function.

17. The computer-readable medium of claim 13 wherein combining the static-based predicted value, the dynamic-based predicted value and the acoustic environment-based predicted value comprises:
applying separate weights to each of the static-based predicted value, the dynamic-based predicted value and the acoustic environment-based predicted value to form a weighted static-based value, a weighted dynamic-based value and a weighted acoustic environment-based value; and
summing the weighted static-based value, the weighted dynamic-based value and the weighted acoustic environment-based value.

18. The computer-readable medium of claim 17 wherein the weight applied to the static-based predicted value is a function of a variance for a distribution in the prior model of the dynamic aspects of clean speech.

19. The computer-readable medium of claim 17 wherein the weight applied to the dynamic-based predicted value is a function of a variance for a distribution in the prior model of the static aspects of clean speech.

20. The computer-readable medium of claim 13 further comprising:
repeating the steps to produce a static-based predicted value, to produce a dynamic-based predicted value, to produce an acoustic environment-based predicted value, and to combine the static-based predicted value, the dynamic-based predicted value and the acoustic environment-based predicted value for each mixture component in a set of mixture components to thereby produce a set of components for the noise-reduced feature vector; and
combining the components in the set of components for the noise-reduced feature vector to produce the noise-reduced feature vector.

21. A computer-readable medium having computer-executable instructions for performing steps comprising:
using a prior model of static aspects of clean speech to produce a static-based predicted value;

using a prior model of dynamic aspects of clean speech to produce a dynamic-based predicted value;
applying a noisy feature vector representing a frame of noisy speech to an acoustic environment model to produce an acoustic environment-based predicted value; and
combining the static-based predicted value, the dynamic-based predicted value and the acoustic environment-based predicted value to form at least one component of a noise-reduced feature vector through steps comprising:
applying separate weights to each of the static-based predicted value, the dynamic-based predicted value and the acoustic environment-based predicted value to form a weighted static-based value, a weighted dynamic-based value and a weighted acoustic environment-based value; and
summing the weighted static-based value, the weighted dynamic-based value and the weighted acoustic environment-based value.

22. The computer-readable medium of claim 21 wherein using a prior model of static aspects of clean speech comprises selecting a mean of a distribution in the prior model of static aspects of clean speech as the static-based predicted value.

23. The computer-readable medium of claim 21 wherein using a prior model of dynamic aspects of clean speech comprises adding a noise-reduced feature vector to a mean of a distribution in the prior model of dynamic aspects of clean speech to produce the dynamic-based predicted value.

24. The computer-readable medium of claim 21 wherein applying a noisy feature vector to an acoustic environment model further comprises applying an estimate of the noise in the frame to the acoustic environment model.

25. The computer-readable medium of claim 24 wherein the acoustic environment model is based on a non-linear function that describes a relationship between a noisy feature vector, a clean feature vector, and a noise feature vector.

26. The computer-readable medium of claim 25 wherein the acoustic environment model is formed from a Taylor series approximation to the non-linear function.

27. The computer-readable medium of claim 21 wherein the weight applied to the static-based predicted value is a function of a variance for a distribution in the prior model of the dynamic aspects of clean speech.

28. The computer-readable medium of claim 21 wherein the weight applied to the dynamic-based predicted value is a function of a variance for a distribution in the prior model of the static aspects of clean speech.

29. The computer-readable medium of claim 21 further comprising:
repeating the steps to produce a static-based predicted value, to produce a dynamic-based predicted value, to produce an acoustic environment-based predicted value, and to combine the static-based predicted value, the dynamic-based predicted value and the acoustic environment-based predicted value for each mixture component in a set of mixture components to thereby produce a set of components for the noise-reduced feature vector; and
combining the components in the set of components for the noise-reduced feature vector to produce the noise-reduced feature vector.

* * * * *